United States Patent [19]

Kyrklund

[11] 4,170,874
[45] Oct. 16, 1979

[54] GAS TURBINE UNIT

[75] Inventor: Ben Kyrklund, Finspong, Sweden

[73] Assignee: Stal-Laval Turbin AB, Finspong, Sweden

[21] Appl. No.: 853,114

[22] Filed: Nov. 21, 1977

Related U.S. Application Data

[63] Continuation of Ser. No. 632,395, Nov. 17, 1975, abandoned, which is a continuation of Ser. No. 414,379, Nov. 9, 1973, abandoned.

[30] Foreign Application Priority Data

Nov. 13, 1972 [SE] Sweden .............................. 14684/72

[51] Int. Cl.$^2$ ......................... F02C 7/06; F01D 17/14
[52] U.S. Cl. ................................. 60/39.18 C; 415/160; 416/223 A
[58] Field of Search ................... 60/39.29 R, 39.18 C; 415/161, 162, 143, 149, 160, 199; 416/223 A

[56] References Cited

U.S. PATENT DOCUMENTS

| 2,565,324 | 8/1951 | Ray | 60/39.29 |
| 2,649,243 | 8/1953 | Stalker | 415/199 |
| 2,732,999 | 1/1956 | Stalker | 415/199 |
| 3,609,967 | 10/1971 | Waldmann | 60/39.18 C |

FOREIGN PATENT DOCUMENTS 51150 12/1911 Austria ..................................... 415/199

OTHER PUBLICATIONS

Kuethe & Schetzer, *Foundations of Aerodynamics*, Wiley & Sons Inc., New York, 1967, pp. 82-83, 86-87.

Primary Examiner—Louis J. Casaregola
Attorney, Agent, or Firm—Eric Y. Munson

[57] ABSTRACT

A gas turbine unit comprising an expansion turbine, a compressor and a turbine engine arranged in sequence on a common shaft. The rotor element of the expansion turbine comprises fan blades having a straight non-curved profile. Guide vanes are provided upstream of the expansion turbine to form a throttling device for controlling the flow of air to the expansion turbine. The guide vanes are adjustable relative to the blades of the expansion turbine to deflect the air to vary the throttling effect to cause the expansion turbine to operate alternately as a compressor and a turbine in response to the adjustment of the guide vanes.

4 Claims, 2 Drawing Figures

GAS TURBINE UNIT

This is a continuation of Ser. No. 632,395, filed 11/17/75, now abandoned, which, in turn, is a continuation of Ser. No. 414,379 filed 11/9/73, now abandoned.

BACKGROUND OF THE INVENTION

When using gas turbines for vehicle propulsion and for other purposes with widely varying power requirement, it has been found difficult to obtain a reasonable degree of efficiency over a sufficiently large load area. A considerable improvement has been reached, however, by arranging an expansion turbine with adjustable inlet guide vanes on the compressor shaft in front of the compressor, and in this way the gas turbine can attain good efficiency down to one fourth of the full load, at the same time as the adjustable inlet guide vanes for the expansion turbine constitute a convenient control member for the gas turbine. At full load and accordingly full opening of the inlet guide vanes, however, the conditions of flow in the expansion turbine will be less suitable if the expansion turbine continues to operate at the same speed as the compressor, since the expansion turbine in this case tends to work as a compressor, for which the turbine blade profiles are very inconvenient. For this reason the expansion turbine is generally connected to the compressor by way of an axial clutch which is released when the guide vanes are fully opened, whereafter the expansion turbine is allowed to idle at full speed. Inspite of such arrangement however, the expansion turbine produces quite substantial throttling losses, with consequent deterioration of the efficiency of the whole unit.

SUMMARY OF THE INVENTION

In order to improve the efficiency of the unit, it is proposed according to the invention to design the expansion turbine with straight, non-curved blade profiles, i.e., having a symmetrical airfoil which allow the expansion turbine to operate alternately as a turbine and a compressor. In the case of idle load and hard throttling of the guide vanes the expansion turbine will therefore work as a turbine, whereas in the case of full load and fully opened guide vanes the expansion turbine changes to compressor propulsion as a first step in the subsequent compressor. Thus the expansion turbine will in this case work actively also at full load without causing throttling losses, and by properly dimensioning the compressor and the expansion turbine the optimum efficiency is obtained over the entire load area. At the same time the clutch between the compressor and the expansion turbine may be omitted, which is a considerable advantage.

DESCRIPTION OF A PREFERRED EMBODIMENT

Figure 1:
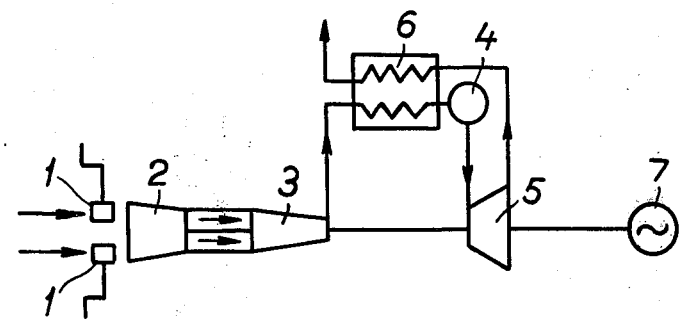
FIG. 1 is a schematic diagram of the gas turbine unit according to the invention.

FIG. 1 shows the adjustable inlet guide vanes 1 for the expansion turbine 2, which is position on the same shaft as the compressor 3, the gas turbine 5 and, for example, a generator 7 or another load, for example the gear box for a vehicle. The air to the unit follows the direction of the arrows, i.e. in through the guide vanes 1, the expansion turbine and the compressor 3. From there the air proceeds through the heat exchanger 6, where the air is heated by the exhaust gases from the gas turbine 5, through the combustion chamber 4 and the turbine 5 and through the heat exchanger to the exhaust discharge.

Figure 2:
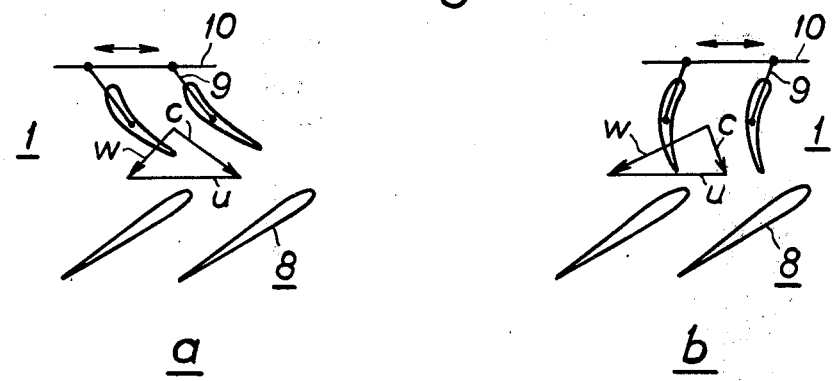
FIG. 2 shows the expansion turbine with blades according to the invention and guide vanes at light load and full load.

The profile of the blade system for the expansion turbine is clear from FIG. 2 a and b, in which FIG. 2a shows the conditions at idle load where the expansion turbine works as a turbine, whereas FIG. 2b shows full load where the expansion turbine works as a compressor. The condition for this being possible with reasonable efficiency in both cases are the straight or plane, i.e. non-curved, blades 8 according to the invention, which work with reasonable effect independent of the distribution of pressure on the two sides. FIG. 2 shows the inlet guide vanes 1 with swinging brackets 9 mounted thereon and connected to a control ring 10 which extends around the circumference of the entire expansion turbine.

In FIG. 2a the guide vanes 1 are adjusted with relatively hard throttling corresponding to idle load and in FIG. 2b the guide vanes are fully opened corresponding to full load. The arrows c and w respectively, for the actual direction of flow of the air and the relative flow with respect to the turbine blades 8 have been illustrated, and it is clear that FIG. 2a corresponds to turbine propulsion with the highest pressure on the upper side of the blades 8, whereas FIG. 2b corresponds to compressor propulsion with the highest pressure on the lower side of the blades 8. Because of the straight, non-curved profile or symmetrical airfoil of the blades 8 these will work with the same efficiency in both cases. The speed u of the blades 8 is the same in both cases.

If the output shaft of the unit is to be operated at variable speed the gas turbine 5 may be divided into two turbines of which the first one drives the compressor 3, whereas the second one is provided with adjustable inlet guide vanes and drives the output shaft at the desired speed. This necessitates mutual control of the two systems of guide vanes, which however does not affect the operation of the expansion turbine 2 according to the invention.

I claim:

1. In a gas turbine power plant unit, including in sequence, an expansion turbine connected to the input end of a compressor and a main turbine connected to the output end of the compressor by way of a combustion chamber for supplying a flow of hot gas to drive the main turbine, the expansion turbine being provided with adjustable guide vanes for directint the flow of air thereto; the improvement which enables the expansion turbine to operate alternately as compressor and auxilliary turbine without use of clutch means with consequent minimized power losses, said improvement comprising:

(a) a rotor for said expansion turbine, comprising a series of fan blades having the profile of a symmetrical air foil;

(b) said guide vanes being adjustable relative to said fan blades to direct the flow of air to said air foil blades to vary their angle of attack relative to the air flow to provide the sole means for continuously alternating the operation of said expansion turbine between maximum compressor operation and maximum turbine operation in response to variations in power plant load conditions between full load and idle load respectively;

(c) said expansion turbine, said compressor, and said main turbine being mounted on an uninterrupted common shaft.

2. The improvement in a turbine power plant unit according to claim 1, in which the expansion turbine operates as a compressor when the air flow is directed against the downstream surface of the rotating symmetrical air foil blades.

3. The improvement in a turbine power plant unit according to claim 1, in which the expansion turbine operates as a turbine when the air flow is directed against the upstream surface of the rotating symmetrical air foil blades.

4. The improvement in a turbine power plant unit according to claim 1, in which the guide vanes have the profile of a cambered air foil cross section to direct the flow of air to said fan blades along a curved path.

* * * * *